H. A. LUCK.
NUT LOCK.
APPLICATION FILED JAN. 8, 1910.

976,890.

Patented Nov. 29, 1910.

Witnesses
Lloyd W. Patch
A. A. Hammond

Inventor
Harry A. Luck
By Vernon E. Hodges
his Attorney

UNITED STATES PATENT OFFICE.

HARRY A. LUCK, OF LEWISTOWN, PENNSYLVANIA.

NUT-LOCK.

976,890.

Specification of Letters Patent.  Patented Nov. 29, 1910.

Application filed January 8, 1910.  Serial No. 537,069.

*To all whom it may concern:*

Be it known that I, HARRY A. LUCK, a citizen of the United States, residing at Lewistown, in the county of Mifflin and State of Pennsylvania, have invented certain new and useful Improvements in Nut-Locks, of which the following is a specification.

My invention relates to an improvement in nut locks, and is adapted more particularly to axles of vehicles for holding the hub nut on, although, of course, it would have a much wider range of application, as it may be used almost anywhere where a nut-lock would be advantageous.

It consists in a toothed extension on the spindle or bolt, in connection with a dog or pawl so mounted in the nut that it may be made to engage or disengage the teeth of the projection, and a screw on which the dog or pawl is secured, the threads of which screw turn in threads in an orifice in the nut, in such a way, that the outward turn of the screw to throw the dog or pawl into engagement with the teeth, throws the latter against the inner end wall of the nut, where the dog or pawl remains against accidental displacement, owing to the fact that a screw is never known to work inward, whereas its tendency is always outward, which tendency in this instance is resisted by the pawl or dog striking against the inner end wall of the nut when it engages the teeth of the projection.

My invention further consists in certain novel features of construction, and combinations of parts which will be hereinafter described and pointed out in the claims.

Figure 1:
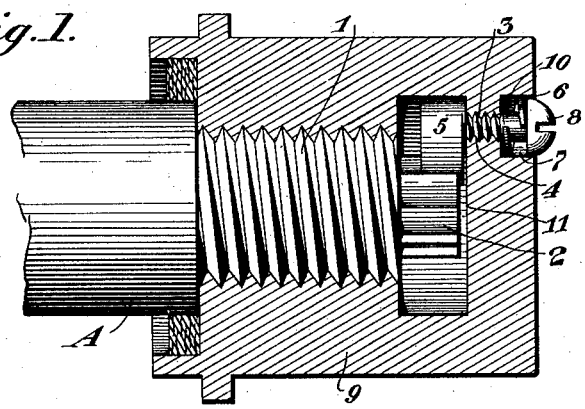
Figure 2:
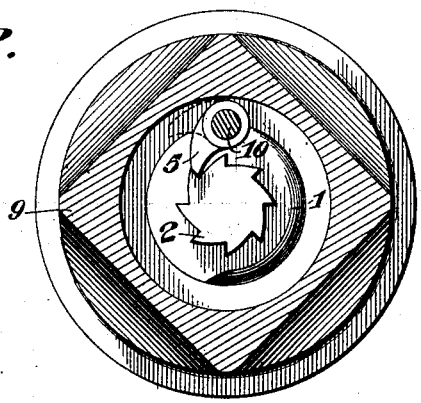
Figure 3:
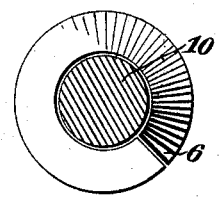

In the accompanying drawings:—Figure 1 is a longitudinal sectional view through the nut, showing the nut lock applied, Fig. 2 is a transverse section through the nut and screw, and Fig. 3 is an enlarged detail in section through the screw and showing a split washer around the neck of the screw.

A, represents an axle skein having the usual threaded nut 1, and the extension at the outer end of this threaded portion has ratchet teeth 2 thereon. A screw 3 fits the threads of a threaded orifice 4, and has a dog or pawl 5 on its inner end with a split washer 6 housed in the orifice 7, and surrounding the neck 10 of the screw and pressing outwardly on the head 8 thereof, so that the screw is held frictionally tight in the threaded orifice 4 in the nut 9.

In operation, the nut 9 is turned on the threaded ends 1 of the axle skein or bolt in the usual manner, after which a screw driver is applied to the head 8, and the screw is given a partial turn to the left, simultaneously throwing the dog or pawl 5 into engagement with the ratchet teeth 2, and forcing it outwardly against the inner end wall 11 of the nut 9, where it remains locked, due to the tendency of the screw to work out instead of in. To augment this tendency, the split washer 6 is employed, the expansive action of which against the head 8 is to greatly increase the frictional action of the screw in the threaded orifices thus and thereby greatly reducing the tendency of the screw to turn inward, and which would cause the dog or pawl to disengage the ratchet teeth 2. In this way, a very simple and yet effectual means is provided for insuring the permanency of the action of the nut lock. At the same time, a device is provided which is easily and cheaply constructed, and applicable to any part for which a nut lock might be required.

It is evident that more or less slight changes might be made in the form and arrangement of the several parts described, without departing from the spirit and scope of my invention, and hence I do not wish to limit myself to the exact construction herein set forth, but:—

Having fully described my invention, what I claim as new and desire to secure by Letters Patent, is:—

1. The combination with a threaded member and a nut, the threaded portion having a toothed extension, of a lock comprising a screw which turns in a threaded orifice in the nut, and a pawl or dog on the inner end of the screw arranged to be thrown into engagement with the toothed extension by turning the screw outward.

2. The combination with a threaded member and a nut, the threaded portion having a toothed extension, of a lock comprising a screw which turns in a threaded orifice in the nut, and a pawl or dog on its inner end arranged to be thrown into engagement with the toothed extension by turning the screw outward, the pawl or dog being thereby forced frictionally against the inner end wall of the nut.

3. The combination with a threaded member and a nut, the threaded portion having a toothed extension, of a lock comprising a screw which turns in a threaded orifice in the nut, and a pawl or dog on its inner end arranged to be thrown into engagement with the toothed extension by turning the screw outward, the pawl or dog being thereby
5 forced frictionally against the inner end wall of the nut, and a resilient split washer bearing outwardly against the screw.

In testimony whereof I affix my signature, in the presence of two witnesses.

HARRY A. LUCK.

Witnesses:
WM. H. WREN,
W. P. SEAVER.